Jan. 20, 1953 N. B. NICHOLS 2,625,822
DIGITAL INDICATING ARRANGEMENT FOR MEASURING SYSTEMS
Filed June 15, 1949 3 Sheets-Sheet 3

*INVENTOR.*
NATHANIEL B. NICHOLS
BY
D. Clyde Jones
ATTORNEY

Patented Jan. 20, 1953

2,625,822

UNITED STATES PATENT OFFICE 2,625,822

DIGITAL INDICATING ARRANGEMENT FOR MEASURING SYSTEMS

Nathaniel B. Nichols, Rochester, N. Y., assignor to Taylor Instrument Companies, Rochester, N. Y., a corporation of New York Application June 15, 1949, Serial No. 99,266

3 Claims. (Cl. 73—360)

This invention relates to a measuring system and to a digital indicator for use therein.

In many measuring systems, much difficulty has been encountered in obtaining accurate readings due to parallax and also due to the fact that convenient dial sizes necessitate such graduations thereon, that an observer finds it practically impossible to determine the fractional values accurately.

In accordance with the present invention, it is proposed to set up a measured value on a digital indicator in which there appears numerals or characters corresponding to the several digits of the measured numerical value.

Figure 1:
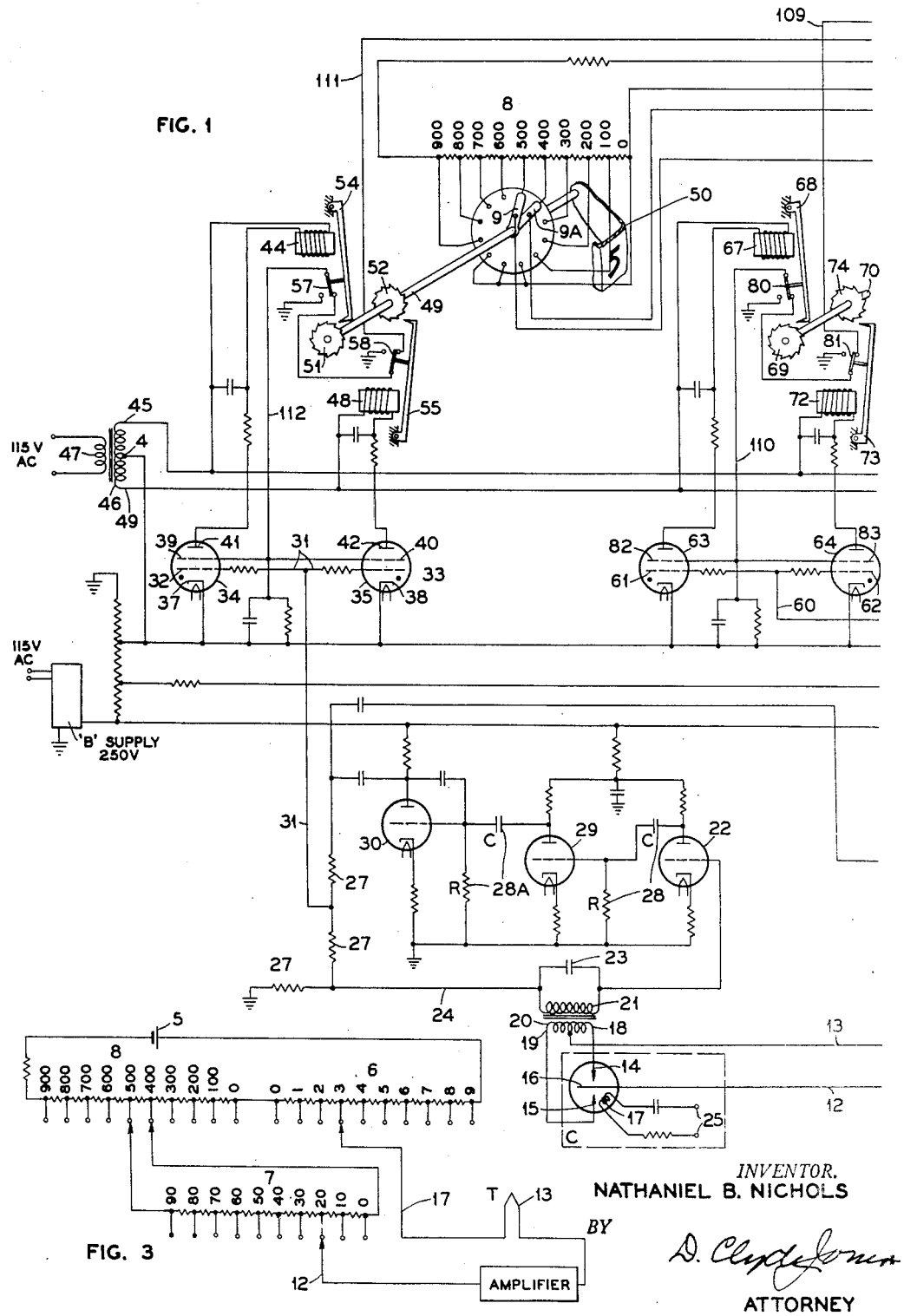
Figure 2:
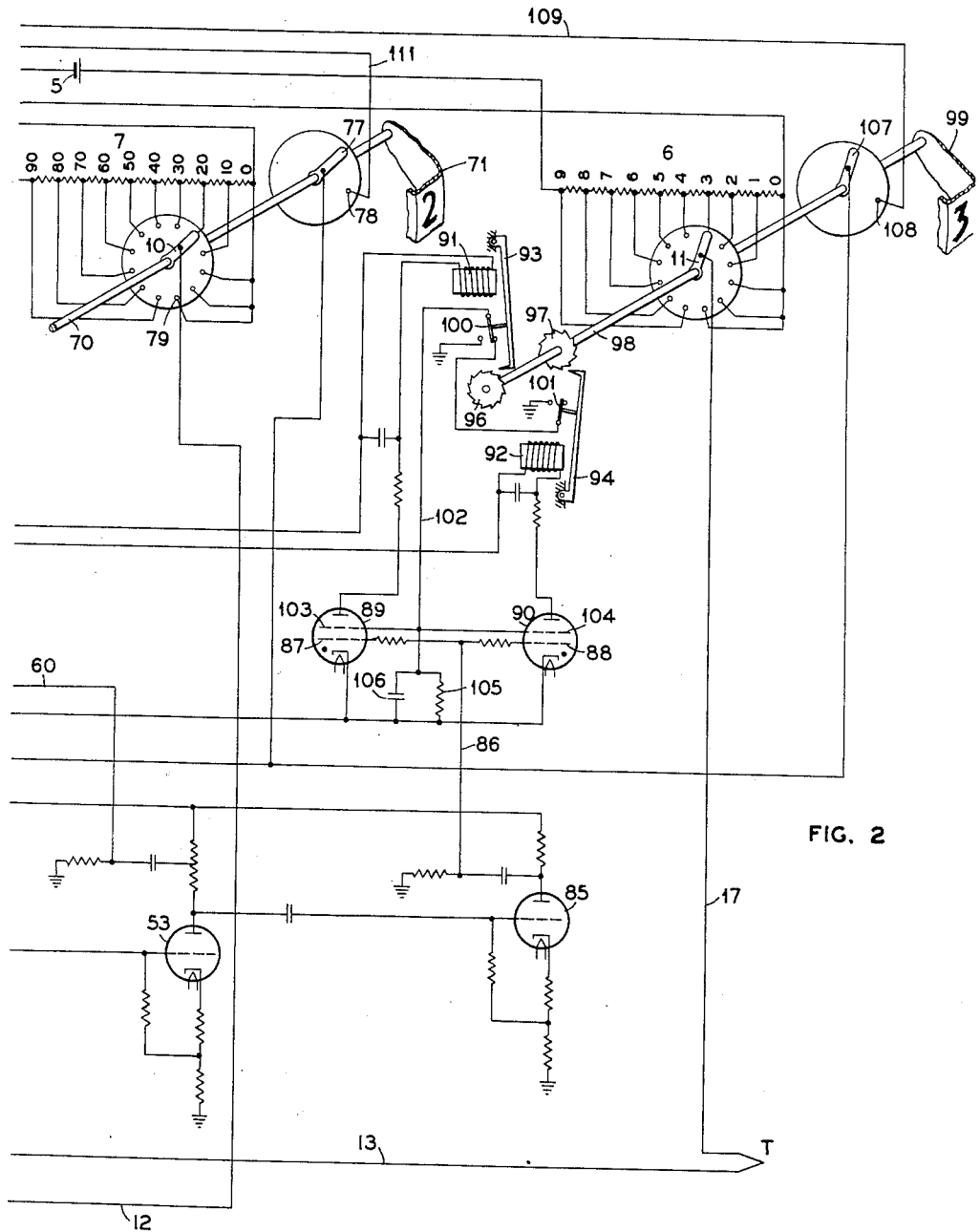
Figure 4:
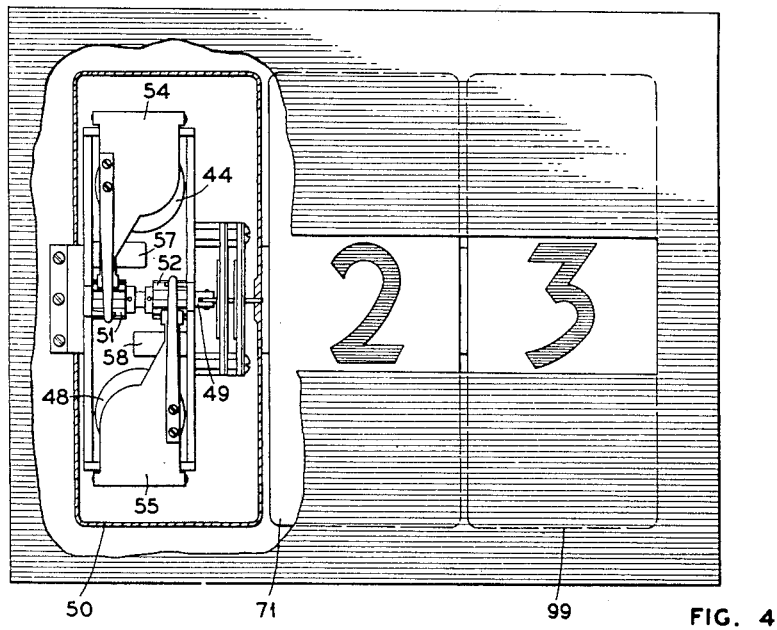
Figure 5:
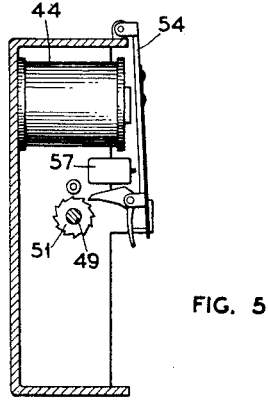
Figure 6:
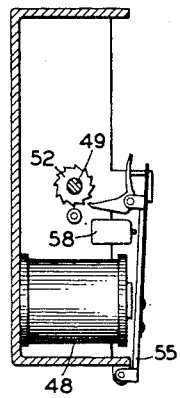

The various features and advantages of the invention will appear from the detailed description and claims when taken with the drawings in which Figs. 1 and 2 are a diagrammatic showing of the measuring system of the present invention having incorporated therein a novel digital indicator; Fig. 3 is a simplified showing of the potentiometer network illustrated in Fig. 1; Fig. 4 is a front view of one form of digital indicator with a portion of its casing removed; and Figs. 5 and 6 are vertical sections through the indicator looking in the direction of the rear and the front thereof respectively.

By way of example, the present measuring system is disclosed as utilized to measure a varying temperature and to set up the numerals corresponding to the several digits of the measured temperature. Other variables can, of course, be measured. In this system, the temperature to be measured is sensed by a thermocouple T which is connected into a potentiometer network. This network includes a battery 5 as well as three groups of resistor elements, 6, 7 and 8 respectively engaged by the contactors 9, 9a, 10 and 11. These several elements are connected into the network and the contactors will be so adjusted automatically that the potential of the battery will be balanced by the D. C. potential developed by the thermocouple T at any given temperature. When the temperature at the thermocouple changes, the mentioned balance will be upset and the resulting difference in potential will be a measure of the change in temperature. Since this D. C. potential must be amplified, preferably by a thermionic amplifier, it is translated into an alternating potential of square wave form, by means of an invertor or "chopper" C of known design, connected in one of the conductors such as 13, leading from the thermocouple to the potentiometer network. This invertor comprises two spaced fixed contacts 14 and 15 positioned to be alternately engaged by a vibrating blade 16 which is connected to a conductor leading to the network. This blade is vibrated by a magnet 17 at the frequency of the alternating current source 25, to which the magnet coil is connected. The fixed contacts 14 and 15 are respectively connected to the terminals 18 and 19 of the primary winding 20 of an iron core transformer, the mid-point of this winding being connected by the conductor 13 to one terminal of the thermocouple T. The other terminal of the thermocouple is connected to the network by conductor 12. The secondary winding 21 of the transformer is included in the input circuit of a thermionic tube 22 constituting the first stage of a multistage amplifier. It will be noted that a capacitor 23 is connected across the transformer winding 21 and the several amplifier stages of the amplifier are designed to provide a low-frequency band pass characteristic whereby the effect of foreign electrical disturbances, tend to be eliminated. Also it will be seen that the grid return 24 is connected to a point above ground potential on the resistor 27 to cause degenerative feed-back and thereby effect more stable gain in the amplifier. The output of the first stage of amplifier is coupled by an R-C coupling including the resistor-capacitor unit 28, to the input circuit of the thermionic tube 29 in the second stage of the amplifier. The second stage is coupled by an R-C coupling including the resistor-capacitor unit 28a, to the input circuit of the thermionic tube 30 in the third stage of the amplifier.

The amplified signal voltage present in the output of this third stage of the amplifier is applied through the branched conductor 31, to the control grids 32 and 33 of the gas-filled arc discharge devices 34 and 35 commonly sold under the trademark Thyratron. These devices also include the cathodes 37 and 38, screen grids 39 and 40, as well as the plates 41 and 42 respectively. It will be seen that the circuits for the heater elements of these devices have been omitted since they are well-known. The plate 41 of the device 34 is connected in series with the coil of magnet 44, to the terminal 45 of the secondary winding 46 of the power transformer, the primary winding 47 of which is connected to the 115-volt, sixty cycle alternating source. The plate 42 of the device 35 is likewise connected in series with the coil of magnet 48, to the terminal 49 of the transformer winding 46. The midpoint 4 of the winding 46 is connected in parallel to the cathodes 37 and 38. The arrangement of the arc discharge devices 34 and 35 is such that when a certain amplified signal voltage of a given phase is applied to the grid 32 of device 34, this device will "fire" to energize magnet 44 and thereby operate a hundreds stepper of the indicator proper, as will be described. Similarly, when a certain amplified signal voltage of another phase is applied to the grid 33 of device 35, this device will "fire" to energize magnet 48 and thereby operate the hundreds stepper of the indicator in the opposite sense.

The magnets 44 and 48 cooperate to position a reversible shaft 49 of the hundreds stepper which carries a drum 50 having on its periphery a series of characters or digits 0 to 9 inclusive corresponding to the hundreds digit, in the illustrated form of the invention. The reversible shaft 49 has secured thereto the ratchet wheels 51 and 52. A pawl 54 operated by the magnet 44 cooperates with ratchet wheel 51 to drive the shaft 49 and its drum 50 in a counterclockwise direction while a pawl 55 operated by the magnet 48 engages the ratchet wheel 52 to rotate the shaft 49 and its drum in a clockwise direction. The rotation of the shaft and its drum in either of the mentioned directions brings one of the characters thereon into reading position.

It will be noted that when pawl 54 and ratchet 52 rotate the shaft 49 one step, this pawl actuates the switch 57 to apply ground potential at its normally open contact to the screen 32 of device 34, making screen 32 negative with respect to cathode 34. This insures that the device 34 will be temporarily disabled until the pawl 54 and ratchet 51 have made one complete step. Similarly, the pawl 55 in stepping the ratchet 52, actuates the switch 58 in like manner and for a like reason. The shaft 49 also has mounted thereon the contactors 9 and 9a, movable into engagement with adjacent pairs of fixed contacts connected to the respective sections of the resistor 8.

In order to obtain a more precise reading, the amplified signal voltage in the output of the third amplifier stage is further amplified by being applied through an R-C coupling to the input of a fourth amplifier stage including the thermionic tube 53.

The amplified signal voltage in the output of the fourth amplifier stage is applied through the branched conductor 60, to the respective control grids 61 and 62 of a second pair of gas-filled arc discharge devices 63 and 64. These devices are of the same construction as the arc discharge devices 34 and 35, and are connected for a like function in the circuit arrangement, in the same manner as these last-mentioned devices.

The device 63 has included in its plate circuit a magnet 67 which operates when this device fires. Magnet 67 actuates a pawl 68 which serves with ratchet wheel 69, to rotate in a counterclockwise direction the shaft 70 of the tens stepper of the indicating device. This shaft carries a drum 71 which carries on its periphery numbers or characters such as "0 to 9" inclusive corresponding to the tens digit of the measurement to be indicated. The device 64 on the other hand has included in its plate circuit a magnet 72. This magnet is provided with a pawl 73 which cooperates with a ratchet wheel 74 secured on shaft 70 to rotate this shaft and its drum 71 in a clockwise direction. The shaft 70 also carries a movable contactor 10 rotatable into engagement with the fixed contacts respectively connected to the resistor sections 7 corresponding to the tens portion of the measurement. The shaft 70 also carries a movable contactor 77 insulated from contactor 10 and positioned to engage the fixed contact 78 when the movable contact engages the fixed contact 79 corresponding to zero resistance in the resistor sections 7, that is, the "0" tens digit. The purpose of the movable contactor 77 and the fixed contact 78 will be hereinafter set forth. The pawls 68 and 73 respectively actuate switches 80 and 81 to apply ground potential to the screens 82 and 83 of the devices 63 and 64 to temporarily disable these devices until each step controlled thereby is fully completed.

If a more accurate temperature measurement is desired, the amplified voltage in the output circuit of the third amplifier stage is supplied to a fourth amplifying stage including the thermionic tube 85. The amplified voltage in the output of this tube is applied through the branched conductor 86, to the grids 87 and 88 respectively of the arc discharge devices 89 and 90. These devices are connected in the circuit arrangement and function in the same manner as the arc discharge devices previously referred to. The device 89 includes the magnet 91 in its output circuit while the device 90 includes the magnet 92 in its output circuit. These magnets actuate the pawls 93 and 94 respectively to engage the ratchet wheels 96 and 97 to rotate the shaft 98 of the units stepper of the indicator, counterclockwise and clockwise respectively. Shaft 98 carries a drum 99 with the units digits or characters marked on its periphery. The pawls 93 and 94, as they operate, actuate the switches 100 and 101 to connect ground potential to the screens 103 and 104 of the devices 89 and 90 to disable these devices temporarily until each step is completed. Shaft 98 is provided with a movable contactor 11 positioned to successively engage the fixed contacts respectively connected to the resistor sections 6, each section corresponding to a degree in temperature measurement. Shaft 98 also carries a movable contactor 107 insulated from contactor 11 and arranged to engage the fixed contact 108 when the movable contactor 11 engages the "0" contact of the resistor sections 6.

In the operation of the present invention, let it first be assumed that there is a slow temperature rise at the thermocouple T, which causes the electrical balance of the pontentiometer to be disturbed. As a result of this unbalance, a D. C. potential difference is developed across the conductors 12 and 13. The inverter or chopper C is effective to change this D. C. potential into a square wave signal which is applied to the secondary winding 21 of the transformer, in the first stage of the amplifier which includes the electronic tube 22. This signal is further amplified in the second and third stages of the amplifier, including the electronic tubes 29 and 30, the amplified output being applied over the conductor 31 to the arc discharge devices 34 and 35. Since it has been assumed that the temperature rise is small, the signal at the output of the third stage of the amplifier will be insufficient to fire either the arc discharge device 34 or the arc discharge device 35 corresponding to the hundreds digit of the temperature indicator. This amplified signal will be further amplified in the fourth stage of the amplifier, including the electronic tube 53 but this further amplified signal again will probably be so small that it will not actuate the arc discharge devices 63 and 64 corresponding to the tens digit of the temperature indication. However, this signal will be further amplified in the fifth stage of the amplifier, including the electronic tube 85. This amplified output signal will be applied over the branch conductor 86 to the arc discharge devices 89 and 90. Since it has been assumed that the change in temperature is a temperature rise, the signal will be of such phase that it will "fire" arc discharge device 89. Current will then pass through the arc discharge device 89 in series with the winding of the magnet 91 to energize this magnet and thereby attract the pawl 93. As this pawl is actuated, it will engage the ratchet wheel 96 to rotate the shaft 98 of the units stepper of the indicator, in a counterclockwise direction. The shaft 98 progressively moves the contactor 99 into engagement with the contacts of the several sections corresponding to the units digit of the temperature to be indicated.

As the pawl 93 completes its stroke and engages the ratchet wheel 96, the pawl will close the normally open contacts of switch 100 and thereby apply ground potential over conductor 102. This is effective to charge the capacitor 106 and places the screen 103 at ground potential. This last condition is effective to terminate the "firing" of the arc discharge devices 89 whereupon the magnet 91 deenergizes so that the pawl 93 is restored to its normal position. The pole of the switch 100 is also restored to its normal position.

Since ground potential has been disconnected from the conductor 102 by the restoration of the switch 100, the capacitor 106 will begin to discharge in series with resistor 105, so that on the complete discharge of the capacitor, the arc discharge device 89 will be in readiness to fire again.

The mentioned motion of the movable contactor 11 serves to increase the potential arising from the network across standard cell 5 which decreases the potential difference between conductors 12 and 13. If the potential difference between conductors 12 and 13 still exceeds the units value associating with the units stepper, the arc discharge device 89 will again fire after the charge on condenser 106 has been dissipated through resistor 105. This stepping operation is repeated as often as the rising temperature associating with the thermocouple T produces an increment of the size of the units digit stepper which will operate to indicate this change.

As the units stepper increases its reading to correspond with the rising temperature, it finally indicates the digit value "9." Further increase causes the units stepper to move to the next position which is "0" wherein due to the nature of the resistor sections 6 (which are now effectively eliminated from the network), it delivers zero opposing potential between conductors 12 and 13. For this reason, a high error or signal voltage exists throughout the amplifier and at the control grids of the discharge devices 63 and 64. The magnitude of this signal will be such as to fire the discharge device 63 of the tens stepper. To insure that this error voltage will operate one of the tens digit discharge devices 63 or 64 promptly, a circuit is completed when the units stepper shaft 98 causes the movable contact 107 to engage the fixed contact 108, which circuit applies a positive potential to the conductor 109 and thence through the switches 81 and 80 in their normal position, conductor 110 to the screen grids 82 and 83 of the discharge devices 63 and 64. This assures, in the present instance, that the discharge device 63 will fire promptly.

As the temperature at the thermocouple element T continues to rise, a condition will finally exist when the tens stepper is showing an indication of "90" and then will step forward to "0." At this time, the opposing potential being supplied by resistor sections 7 (which are now effectively eliminated from the network) drops to zero value and leaves a high error voltage between conductors 12 and 13. This causes a high signal voltage to be applied to the control grids 32 and 33 of the discharge devices 34 and 35, the voltage being of such a phase that discharge device 34 fires. In the present instance, the prompt firing of device 34 is assured by the fact that the tens stepper in passing to "0," closes a circuit from a source of positive potential through movable contact 77, fixed contact 78, through conductor 111 and thence through the switches 58 and 57 in their normal positions, conductor 112 and to the screen grids 39 and 40 of the discharge devices 34 and 35. This assures, in the present instance, that the discharge device 34 will advance the hundreds stepper until the correct temperature is indicated, at which time the resistor sections 8, now included in the network, effect a balance of the E. M. F., or error signal, at the thermocouple T.

In the event that the temperature change taking place at the thermocouple T is an abrupt, large change, then the error signal across the conductors 12 and 13 will develop a signal at the output of the third, fourth and fifth stages of the amplifier sufficient to fire the discharge devices 39, 63 and 89, associated with the hundreds, tens and units steppers respectively. This is under the assumption that the temperature rise is great enough to require an operation of the hundreds stepper. Under the conditions just referred to, each of the three steppers will be operated simultaneously to position the three drums so that the appropriate digit corresponding to the hundreds, tens and units portions of the measured temperature is displayed.

Where the hundreds stepper first reduces the error corresponding to the temperature deviation to less than that of the hundreds digit, then the tens stepper reduces the error to less than the tens digit and finally the units stepper completes the indication to the final digit.

In the event that the temperature decreases, the operation of the stepper will be similar to that described but in a reverse sense since the discharge devices 35, 64 and 90 will be operated to actuate the magnets 48, 72 and 92 to cause the pawls 55, 73 and 94 to rotate the several steppers in the reverse direction.

While the digital indicator can be made in various forms, one possible form thereof, is illustrated in Figs. 4, 5 and 6. In this construction, the drums 50, 71 and 99 are mounted within a casing "Case" with their axes in alinement. The casing has a window W in one side thereof behind which the hundreds, tens and units drums are rotatable to advance successive numbers on their peripheries, past the window until the appropriate numbers in the hundreds, tens and units position are displayed to indicate the measured temperature. It will be noted that the magnets such as 44 and 48, as well as related mechanism for advancing a drum such as 50, are located within the drum. This enables the several drums to be mounted in close side-by-side relation for easy reading.

What I claim is:

1. In a self-balancing potentiometer system, a potentiometer network including a source of uniform electromotive force and comprising a plurality of sets of series-connected stepped resistors, each set being of different decimal designation, adjustable wiper contacts cooperating with each set, the sets and the contacts being connected in the network to provide a potentiometer balancing resistance comprising portions of the sets of resistors, a thermocouple exposed to a temperature to be measured and connected to said potentiometer network so that its output electromotive force opposes that of said potentiometer across said balancing resistance, detecting means for detecting the unbalance between said electromotive forces, mechanism responsive to said detected unbalance for adjusting said wiper members over the sets of resistance in accordance with the magnitude of their decimal designation until the smallest designated resistor set is adjusted to balance said electromotive force, means including a digital register for exhibiting each digit of the value of the temperature to which said thermocouple is exposed, said register comprising separate members each exhibiting a series of numerals from 0 to 9 and each member being designated a decimal order corresponding to each of said sets of stepped resistors, means connected to said wiper adjusting mechanism to selectively position said members in accordance with said wiper adjustments to exhibit the numerals making up the numerical value of said temperature.

2. In a self-balancing potentiometer system, a potentiometer network including a source of uniform electromotive force and comprising a plurality of sets of series-connected stepped resistors, each set being of different decimal designation, adjustable wiper contacts cooperating with each set, the sets and the contacts being connected in the network to provide a potentiometer balancing resistance comprising portions of the sets of resistors, a thermocouple exposed to a temperature to be measured and connected to said potentiometer network so that its output electromotive force opposes that of said potentiometer across said balancing resistance, detecting means for detecting the unbalance between said electromotive forces, mechanism responsive to said detected unbalance for simultaneously adjusting said wiper members over the sets of resistance respectively in accordance with the magnitude of their decimal designation until the smallest designated resistor set is adjusted to balance said electromotive force, means including a digital register for exhibiting each digit of the value of the temperature to which said thermocouple is exposed, said register comprising separate members each exhibiting a series of numerals from 0 to 9 and each member being designated a decimal order corresponding to each of said sets of stepped resistors, means connected to said wiper adjusting mechanism to selectively position said members in accordance with said wiper adjustments to exhibit the numerals making up the numerical value of said temperature.

3. In a self-balancing potentiometer system, a potentiometer network including a source of uniform electromotive force and comprising a plurality of sets of series-connected stepped resistors, each set being of different decimal designation, adjustable wiper contacts cooperating with each set, the sets and the contacts being connected in the network to provide a potentiometer balancing resistance comprising portions of the sets of resistors, a thermocouple exposed to a temperature to be measured and connected to said potentiometer network so that its output electromotive force opposes that of said potentiometer across said balancing resistance, detecting means for detecting the unbalance between said electromotive forces, a multi-stage amplifier for amplifying the detected unbalance, mechanism including a plurality of devices responsive to said detected unbalance for adjusting said wiper members over the sets of resistance respectively in accordance with the magnitude of their decimal designation until the smallest designated resistor set is adjusted to balance said electromotive force, each device being operated from a different stage of the amplifier, means including a digital register for exhibiting each digit of the value of the temperature to which said thermocouple is exposed, said register comprising separate members each exhibiting a series of numerals from 0 to 9 and each member being designated a decimal order corresponding to each of said sets of stepped resistors, means connected to said wiper adjusting mechanism to selectively position said members in accordance with said wiper adjustments to exhibit the numerals making up the numerical value of said temperature.

NATHANIEL B. NICHOLS.

REFERENCES CITED

The following references are of record in the file of this patent:

UNITED STATES PATENTS

| Number | Name | Date |
|---|---|---|
| 1,826,879 | Harrison | Oct. 13, 1931 |
| 2,003,681 | Doyle | June 4, 1935 |
| 2,185,767 | Jefferies | Jan. 2, 1940 |
| 2,310,300 | Leathers | Feb. 9, 1943 |
| 2,338,636 | Goodrum et al. | Jan. 4, 1944 |
| 2,405,121 | Fehr | Aug. 5, 1946 |
| 2,428,382 | Prangley | Oct. 7, 1947 |
| 2,446,874 | Geffner et al. | Aug. 10, 1948 |
| 2,436,790 | Cooper | Mar. 2, 1948 |
| 2,461,081 | Pudelko | Feb. 8, 1949 |